Patented Jan. 18, 1949

2,459,686

UNITED STATES PATENT OFFICE 2,459,686

ACETOXY-ALIPHATIC AMIDES

Harold S. Davis, Riverside, Conn., assignor to American Cyanamid Company, New York, N. Y., a corporation of Maine No Drawing. Application June 13, 1947, Serial No. 754,587

4 Claims. (Cl. 260—490)

The present invention relates to α- and β-acetoxy propionamides and butyramides, and to a method for preparing the same.

It has now been discovered that α- and β-acetoxy propionamides and butyramides may be prepared by reacting α- and β-hydroxy propionitriles and butyronitriles, respectively, with glacial acetic acid and hydrogen chloride. The invention also contemplates the products of the reaction.

While the products of the invention are little affected by moderately elevated temperatures, and such may be used if provision is made for the retention of the more volatile constituents of the reaction mixture by the use of suitable reflux condensers and/or a closed reaction vessel, it is generally more convenient to carry out the reaction at room temperature since this avoids the use of such condensers and/or a pressure vessel without requiring an unduly long reaction period. In commercial production where the time element is of paramount importance it is preferred to employ a pressure vessel to permit the use of elevated reaction temperatures of the order of, say, 150° or 200° C. in order to gain the advantage of the attendant shorter reaction periods. While, as indicated above, the use of elevated temperatures requires that provision be made to retain the more volatile constituents of the reaction mixture, particularly the hydrogen chloride, it has been found that at temperatures of the order of room temperature and as high as 50° C. the solubility of the gas in the nitrile and acetic acid is sufficiently high that no such provision for its retention need be made. Accordingly, when carrying out the reaction in an open reaction vessel it is preferred to maintain the reaction mixture at a temperature below about 50° C. However, the reaction is not particularly exothermic in character so that no appreciable rise in temperature is obtained.

In carrying out the reaction, it will be found convenient to admix the hydroxy nitrile and the glacial acetic acid and cool the admixture to ice bath temperatures while passing in the gaseous hydrogen chloride to provide efficient gas absorption. After the desired amount of said gas has been absorbed, as indicated by the gain in weight of the reaction mixture, said reaction mixture may be allowed to stand for a convenient period, as, for example, overnight to permit the reaction to proceed. While much shorter reaction periods may be employed if desired and the product may be separated from the reaction mixture shortly after the absorption of the hydrogen chloride is complete, experience has shown that the reaction mixture should be allowed to stand for a period of at least about one hour and preferably for longer periods of, say, 24 hours in order to obtain best results. After the reaction has gone substantially to completion the α- or β-acetoxy propionamide or butyramide may be separated from the reaction mixture by distillation, crystallization or other conventional methods of separation.

While wide ratios of the reactants may be employed, it is preferred to employ equimolar amounts of the three reactants, that is the hydroxynitrile, the acetic acid and the hydrogen chloride, in order to obtain best results.

Although it is preferred to carry out the reaction without the use of a solvent and/or diluent by simply admixing the three reactants as detailed above, a solvent or diluent may be employed if desired but no substantial advantage can be expected to be derived therefrom. As indicated above, the absence of water is desirable in order to prevent the occurrence of side reactions which decrease the yield of the desired acetoxy aliphatic amide and result in the formation of the corresponding hydroxy aliphatic amide or acid. Accordingly, any solvent or diluent that is employed is preferably anhydrous. Also, hydroxylic solvents such as alcohols are not entirely inert with regard to the reaction and their use is not preferred. Diluents such as the hydrocarbons in which the reactants are substantially insoluble likewise offer no advantage.

The acetoxy aliphatic amides of the present invention are particularly useful as latent curing catalysts in connection with the preparation of resins and plastic materials, and they are also valuable as intermediates in the preparation of chemotherapeutic agents, pharmaceuticals, textile agents, rubber chemicals and the like.

The following examples serve to illustrate more fully the detailed procedures involved in carrying out the process of the invention:

Example 1

142.0 grams of lactonitrile were mixed with 120.0 grams of glacial acetic acid and while the mixture was cooled in an ice bath gaseous hydrogen chloride was bubbled through the mixture until 77.0 grams of the gas had been absorbed. After allowing the resultant mixture to stand for about 2½ hours it had become quite viscous. Thereafter, 158 grams of tertiary butyl alcohol were slowly added with stirring. The resultant mixture was then distilled under reduced pressure to provide 77.0 grams (26% of theory) of α- acetoxy propionamide which was a viscous oil boiling at 147°–150° C./11–12 mm. Although showing signs of incipient crystallization the product remained liquid.

*Example 2*

A mixture of 85.0 grams of acetone cyanohydrin with 60.0 grams of glacial acetic acid was stirred in a flask and cooled in an ice-bath while gaseous hydrogen chloride was passed in. After 36.5 grams of said gas had been absorbed the reaction flask was removed from the ice-bath and the mixture allowed to stand overnight. At the end of this time the mixture had set to a white crystalline mass which after solution in water and neutralization with $K_2CO_3$ provided an almost quantitative yield of α-acetoxy isobutyramide which was a white solid, melting at 108°–109.5° C. after two crystallizations from benzene.

*Example 3*

A mixture of 156.0 grams of ethylene cyanohydrin and 132.0 grams of glacial acetic acid was cooled and gaseous hydrogen chloride was bubbled therethrough. After said mixture had increased in weight by 80.0 grams the addition of said gas was discontinued and the mixture was allowed to stand overnight at room temperature. At the end of this time the viscous mixture was cooled and stirred while 150 grams of $K_2CO_3$ in 200 cc. of water were added. Thereafter, 200 cc. of acetone were added to precipitate the KCL and this salt was filtered off. The acetone and water were evaporated from the filtrate under reduced pressure to provide an 89.2% yield of β-acetoxy propionamide as a light colored, viscous liquid which crystallized on standing overnight. Crystallization from benzene and methyl ethyl ketone provided a product which melted at 93.5°–94.5° C.

While the invention has been described with particular reference to specific embodiments, it is to be understood that it is not to be limited thereto but is to be construed broadly and restricted solely by the scope of the appended claims.

What is claimed is:

1. A method of preparing a member of the group consisting of α-acetoxy propionamide, β-acetoxy propionamide, α-acetoxy butyramides and β-acetoxy butyramides comprising reacting the corresponding hydroxy aliphatic nitrile with glacial acetic acid and hydrogen chloride under substantially anhydrous conditions using substantially equimolar amounts of all three reactants and a temperature within the range of about 0°–50° C.

2. A method of preparing α-acetoxy propionamide comprising reacting lactonitrile with glacial acetic acid and hydrogen chloride under substantially anhydrous conditions at a temperature within the range of about 0°–50° C. using substantially equimolar amounts of said reactants.

3. A method of preparing α-acetoxy isobutyramide comprising reacting acetone cyanohydrin with glacial acetic acid and hydrogen chloride under substantially anhydrous conditions at a temperature within the range of about 0°–50° C. using substantially equimolar amounts of said reactants.

4. A method of preparing β-acetoxy propionamide comprising reacting ethylene cyanohydrin with glacial acetic acid and hydrogen chloride under substantially anhydrous conditions at a temperature within the range of about 0°–50° C. using substantially equimolar amounts of said reactants.

HAROLD S. DAVIS.

REFERENCES CITED

The following references are of record in the file of this patent:

UNITED STATES PATENTS

| Number | Name | Date |
|---|---|---|
| 2,813,357 | Ritchie et al. | Dec. 12, 1939 |
| 2,265,814 | Ritchie et al. | Dec. 9, 1941 |
| 2,396,292 | Slotterbeck | Mar. 12, 1946 |

OTHER REFERENCES

Einhorn: "Annalen," vol. 361, page 142 (1908).
Freudenberg: "Ber. Deut. Chem.," vol. 60B, pages 2456–2457 (1927).